(12) United States Patent
Shiraki et al.

(10) Patent No.: US 9,354,314 B2
(45) Date of Patent: May 31, 2016

(54) UNDERWATER DETECTION DEVICE

(71) Applicant: Furuno Electric Co., Ltd., Nishinomiya (JP)

(72) Inventors: Rika Shiraki, Osaka (JP); Jérôme Dubuis, Kyoto (JP); Yuriko Onishi, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 432 days.

(21) Appl. No.: 13/918,284

(22) Filed: Jun. 14, 2013

(65) Prior Publication Data

US 2013/0343151 A1 Dec. 26, 2013

(30) Foreign Application Priority Data

Jun. 20, 2012 (JP) ................................. 2012-138411

(51) Int. Cl.
*G01S 15/00* (2006.01)
*G01S 15/96* (2006.01)
*G10K 11/20* (2006.01)
*G01S 7/62* (2006.01)

(52) U.S. Cl.
CPC ............... *G01S 15/96* (2013.01); *G01S 7/6227* (2013.01); *G01S 7/6272* (2013.01); *G10K 11/205* (2013.01)

(58) Field of Classification Search
CPC .. G10K 11/20; G10K 11/205; G01S 7/52004; G01S 15/96; G01S 7/6272; G01S 7/6227; G03B 42/46
See application file for complete search history.

(56) References Cited

U.S. PATENT DOCUMENTS

| | | | | | |
|---|---|---|---|---|---|
| 5,561,641 | A | * | 10/1996 | Nishimori | G01S 3/80 367/110 |
| 5,648,940 | A | * | 7/1997 | McCool | G01S 15/582 367/131 |
| 6,222,449 | B1 | * | 4/2001 | Twining | A01K 97/00 177/148 |
| 6,510,107 | B2 | * | 1/2003 | Diachok | G01S 15/96 367/131 |
| 2003/0202426 | A1 | * | 10/2003 | Ishihara | G01S 15/96 367/103 |
| 2005/0226099 | A1 | * | 10/2005 | Satoh | G01S 7/521 367/99 |
| 2006/0280030 | A1 | * | 12/2006 | Makris | G01S 7/52004 367/11 |
| 2008/0013404 | A1 | * | 1/2008 | Acker | G01S 7/003 367/88 |

FOREIGN PATENT DOCUMENTS

| | | |
|---|---|---|
| JP | H10090411 A | 4/1998 |
| JP | 2008267834 A | 11/2008 |
| JP | 2010261883 A | 11/2010 |

* cited by examiner

*Primary Examiner* — Luke Ratcliffe
*Assistant Examiner* — Hovhannes Baghdasaryan
(74) *Attorney, Agent, or Firm* — Alleman Hall McCoy Russell & Tuttle LLP (57) ABSTRACT

An underwater detection system is provided that can effectively use a discrimination result. A fish detector of the system is configured to implement a discrimination function including a fish species discrimination function; however, a fish detector and a sonar of the system do not comprise such a discriminator including a fish species discriminator. The fish detector transmits various discrimination results such as fish species discrimination, etc., through an onboard LAN to the fish detector or the sonar. The fish detector and the sonar superimpose various received discrimination results on the detection result of the device itself and display them on a display.

12 Claims, 8 Drawing Sheets

| ITEM | | RESULT | |
|---|---|---|---|
| POINT A | LOCATION | (+35.20.55.123,+139.30.51.567) | |
| | FISH DEPTH | 160M | |
| POINT B | LOCATION | (+35.19.55.123,+139.28.51.567) | |
| | FISH DEPTH | 200M | |
| FISH SPECIES | DEGREE OF SIMILARITY | MACKEREL | 99% |
| | | HERRING | 16% |
| | FISH LENGTH | 30CM | |

UNDERWATER DETECTION DEVICE

FIELD OF THE INVENTION

The present invention relates to an underwater detection device that detects a school of fish by transmitting an acoustic wave underwater and receiving an echo.

BACKGROUND ART

A conventional underwater detection device as shown in the Patent Document 1 discriminates fish species based on an envelope of the echo.

RELATED ART

Patent Document

Patent Document 1: Japanese Unexamined Patent Application Publication No. 2008-267834

SUMMARY OF THE INVENTION

Problems to be Solved by the Invention

However, with the conventional device, a discrimination result is displayed only on a display of an underwater detection device and is not used effectively.

Accordingly, it is a primary object of the present invention that provides an underwater detection device, an underwater display system, a program and an underwater display method that can use a discrimination result effectively.

BRIEF SUMMARY OF THE INVENTION

An underwater detection device according to the present invention, which detects a school of fish based on an echo obtained from underwater detection by transmitting and receiving an underwater ultrasonic signal and displays an echo image of the school of fish on a screen, comprises an acquisition module that acquires fish species information in connection with position information indicating a position where an external device distinguished the fish species information, a determiner that decides based on the position information whether the school of fish displayed as the echo image on the screen and the school of fish for which fish species information has been acquired by the acquisition module are the same school of fish or not, and a display combiner that displays the acquired fish species information on the screen by superimposing on the echo image of the school of fish when the determiner determines they are the same school of fish.

In this manner, the underwater detection device receives the fish species information including the information such as a fish species discrimination result or a fish body length, etc. from the external device (for example, a fish detector) having a fish species discrimination function and displays the various received discrimination results on the display by superimposing on the detection result of the device itself and therefore the discrimination result can be used effectively. For example, even if there are a plurality of underwater detection devices, various kinds of information can be collected or gathered to one device. In particular, in many cases users determine a school of fish to catch by comparing the echo images of a plurality of fish detectors or the echo image of a sonar when they fish; however, the underwater detection device according to the present invention enables determination of the school of fish to catch by collecting or gathering the discrimination result for each school of fish at one fish detector or the sonar.

In addition, the position information includes longitude, latitude, and information such as a depth of the school of fish.

The external device is not limited merely to other underwater detection devices provided on the subject ship but also to underwater detection devices provided on other ships.

Effects of the Invention

According to the present invention, the underwater detection fish species discrimination result can be used effectively.

BRIEF DESCRIPTION OF THE DRAWINGS

FIG. 5 (A) is a block diagram showing a component of a fish detector 2, and FIG. 5 (B) is a block diagram showing a component of a sonar 3.

FIG. 6 (A) is a flow chart showing operations of a fish detector 1, and FIG. 6 (B) is showing a flow chart showing operations of a fish detector 2 (or a sonar 3).

DETAILED DESCRIPTION OF THE EMBODIMENTS

Figure 1A:
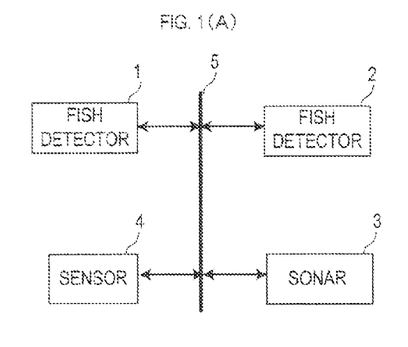
FIGS. 1(A) and 1(B) are block diagrams showing a component of an underwater detection system.

A first embodiment. FIG. 1 (A) is a block diagram of an underwater detection system according to a first embodiment of the present invention. The underwater detection system comprises a plurality of underwater detection devices connected through an onboard LAN 5. In an example of FIG. 1 (A), the underwater detection device comprises a fish detector 1, a fish detector 2, a sonar 3, and a sensor 4. In the first embodiment, the fish detector 1 is the equivalent of an external device of the present invention, and the fish detector 2 and the sonar 3 are the equivalent of the underwater detection device of the present invention. The sensor 4 includes an azimuth sensor or a location sensor (GPS or LORAN, etc.) and acquires a position (longitude and latitude) of the ship itself (i.e., the subject ship). Although the present embodiment shows an example in which the sensor 4 is connected to each device such as the fish detector 1, the fish detector 2, and the sonar through onboard LAN 5, an embodiment in which the sensor 4 is built in each device might be also possible.

Although the fish detector 1 has various discrimination functions including a fish species discrimination, the fish detector 2 and sonar 3 do not have various discrimination functions including fish species discrimination. Therefore, with the underwater detection system according to this embodiment, by transmitting various discrimination results such as the fish species discrimination of the fish detector 1 by onboard LAN 5 and displaying them including the detection result of the fish detector 2 or the sonar 3, the underwater detection device lacking functions such as the fish species discrimination can also display the discrimination results.

Figure 1B:
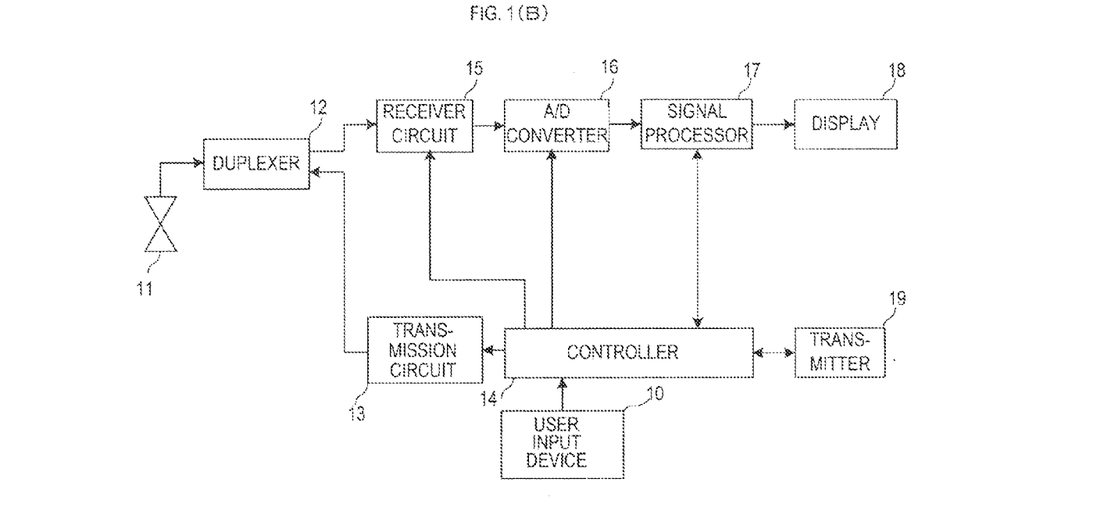

Hereinafter, the components and the functions of each device are explained. FIG. 1 (B) is a block diagram showing a component of the fish detector 1. The fish detector 1 comprises an user input device 10, an echo sounder transducer 11, a duplexer 12, a transmission circuit 13, a controller 14, a receiver circuit 15, an A/D converter 16, a signal processor 17, a display 18, and a transmitter 19.

The controller 14 is for centralized controlling of the fish detector. The controller 14 sets up a transmission period and a detection range, etc., of the transmission circuit 13 according to each operation (instruction input, etc. for setting up the detection range, etc.) from the user input device 10 and executes a sampling period setting of the corresponding A/D converter 16 and provides the command instructions for various processes to the signal processor 17. The display 18 displays echo data on the screen with the longitudinal axis as the depth direction and the horizontal axis as the time direction.

The transmission circuit 13 inputs a pulsating signal to the echo sounder transducer 11, which is a transmitter and receiver, through the duplexer 12 embedded in a trap circuit. An input timing, a level, and a pulse duration, etc., of the signal are controlled by the controller 14. The echo sounder transducer 11 is a vibrator installed on a ship bottom, etc., and outputs an ultrasonic wave underwater according to the pulsating signal inputted from the transmission circuit 13.

The ultrasonic wave outputted from the echo sounder transducer 11 is reflected by targets such as a single fish, a school of fish, and the bottom of the sea, etc., and is received as the echo signal. The echo sounder transducer 11 outputs the received signal according to an intensity of the received echo signal to the receiver circuit 15 through the duplexer 12. The receiver circuit 15 amplifies the inputted received signal and outputs it to the A/D converter 16. The A/D converter 16 converts the received signal to a digital signal with a predetermined sampling period and outputs it to the signal processor 17. The signal processor 17 records the digitalized received signal in memory (not shown) in sequence.

In addition, the controller 14 receives position information from the sensor 4 for each transmission and reception of the ultrasonic wave and records the position information in memory (not shown) for each transmission and reception timing (every ping) of the ultrasonic wave.

The signal processor 17 executes various processes such as an ocean bottom detection process and a fish species discrimination process based on the received signal recorded in memory. The information showing the results of the ocean bottom detection process and the fish species discrimination process is displayed on the screen of the display 18, and they are output to other devices through the transmitter 19 and the onboard LAN 5.

Figure 2:
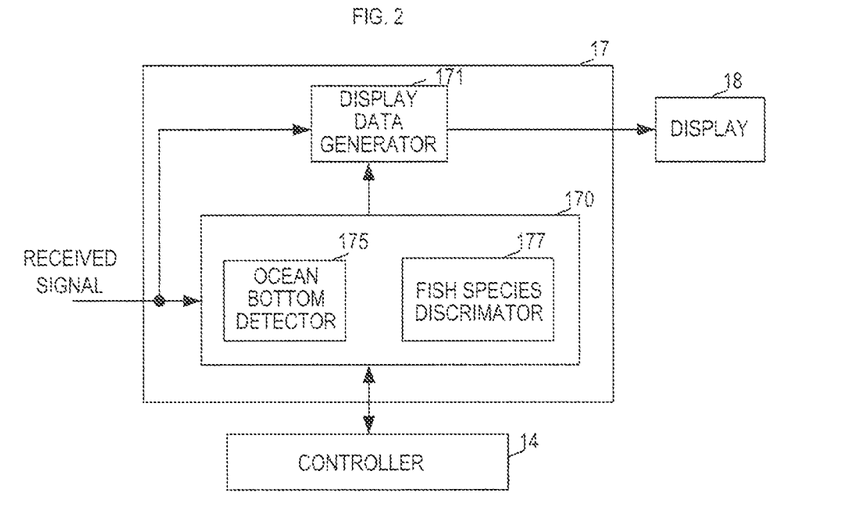
FIG. 2 is a block diagram showing a component of a signal processor 17.

Referring to FIG. 2, a process of the signal processor 17 is explained in detail. FIG. 2 is a block diagram showing components of the signal processor 17. The signal processor 17 comprises a discriminator 170 and a display data generator 171.

The display data generator 171 performs processing to generate display data in order to output each received signal as the detection result to the display 18, as echo data corresponding to a depth according to an elapsed time from outputting the ultrasonic wave. Thus, the display data generator 171 processes each inputted received signal to perform averaging, etc., according to the resolution (longitudinal screen resolution) of the display 18, and compiles them. However, when the longitudinal screen resolution of display 18 is close to or the same as a resolving power of the received signal, the received signal without being processed may become the echo data corresponding to each pixel. As a result, the echo data of the ping of multiple time points is displayed on the display 18.

The discriminator 170 comprises functionally an ocean bottom detector 175 and a fish species discriminator 177 and each of them analyzes the received signal and executes various processes such as an ocean bottom detection process and a fish species discrimination process.

The ocean bottom detector 175 detects an ocean bottom depth from the received signal. The information showing the detected ocean bottom depth is outputted to the display data generator 171 and the controller 14. Regarding a detection technique for the ocean bottom depth, a variety of techniques can be used; for example, a technique on the basis of a timing at which a received signal having more than a threshold value is received, another technique on the basis of a timing at which a derivative value becomes the highest, or another technique on the basis of a timing at which a correlation value becomes the highest wherein the correlation is measured with the received signal by making a waveform equal (or near) to a pulse width of the outputted ultrasonic wave into a reference signal.

The fish species discriminator 177 discriminates the fish species from the received signal. The fish species are discriminated by an echo area (sample number) of a single fish or a school of fish, an average strength, an average time length (average length of a depth direction), or a reverberation part (tailing). Moreover, it may be discriminated by the matching degree (similarity) of the echo of the single fish or the school of fish to reference data.

Figure 3A:
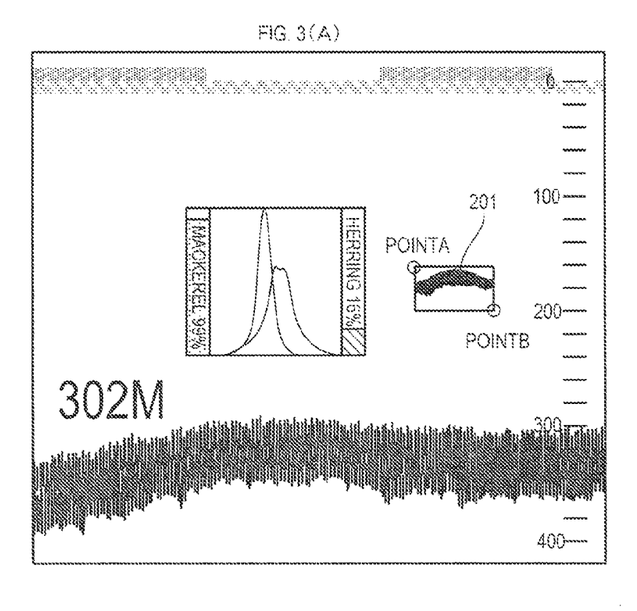
FIGS. 3(A), 3(B) and 3(C) are diagrams showing a display example of a display 18.
Figure 4:
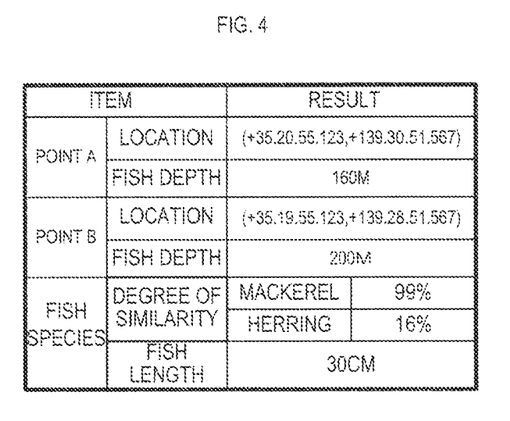
FIG. 4 is a diagram showing information that a discriminator 170 outputs.

FIG. 3 (A) is an illustration showing a display example of the display 18. FIG. 4 is an illustration showing information that the discriminator 170 outputs (the fish species information in this example). The display data generator 171 is equivalent of the display combiner of the present invention and generates a display data in which the information that the discriminator 170 outputs is superimposed and displayed on the echo data showing the detection result.

As shown in FIG. 3 (A), the echo data which assigned the ping at a longitudinal axis and the depth at a vertical axis is displayed in display 18. In the example of FIG. 3 (A), an echo data 201 of the school of fish is displayed on the right hand side of the middle of the screen as the detection result. Moreover, the ocean bottom depth (showing 302$m$ in the figure) as a result of the ocean bottom detection processing, and a result of the fish species discrimination (the histogram indicates Mackerel 99% and Herring 16% in the figure) are displayed.

The ocean bottom depth detected by the newest ping is displayed. As the result of the fish species discrimination, the discrimination result is displayed about the echo data (echo data 201 in this example) of any one of or all of the schools of fish displayed on the screen.

In addition, although the ocean bottom depth is shown on the left hand side screen and the fish species discrimination result is shown in vicinity of the echo data of the school of fish in this example, the display positions of a variety of information are not restricted to this example.

As shown in FIG. 4, a variety of information (the result of the fish species discrimination, here) with corresponding position information is transmitted to other devices. For example, regarding the fish species information corresponding to the echo data 201 of the school of fish shown in FIG. 3 (A), the position information received from the sensor 4 at the time when the ultrasonic wave in the most past ping (point A) was transmitted among the echo data 201 and the position information received from sensor 4 at the time when the ultrasonic wave in the newest ping (point B) was transmitted from the corresponding echo data 201. In the position information, the depth information of the school of fish is included. The depth of the school of fish is equivalent to the shallowest depth among the detected school of fish at point A and is equivalent to the deepest depth among the detected school of fish at point B. The fish species information includes similarity in each fish species name and the fish body length.

In addition, the position information may be position information received from the sensor 4 at the timing of the transmitted ultrasonic wave in the oldest ping (point A) and the newest ping (point B) within a range selected on the screen of the detection result, upon a user operating the input device 10.

The fish species information such as mentioned above is transmitted to the fish detector 2 and the sonar 3 through the controller 14, the transmitter 19, and the onboard LAN 5.

Figure 5A:
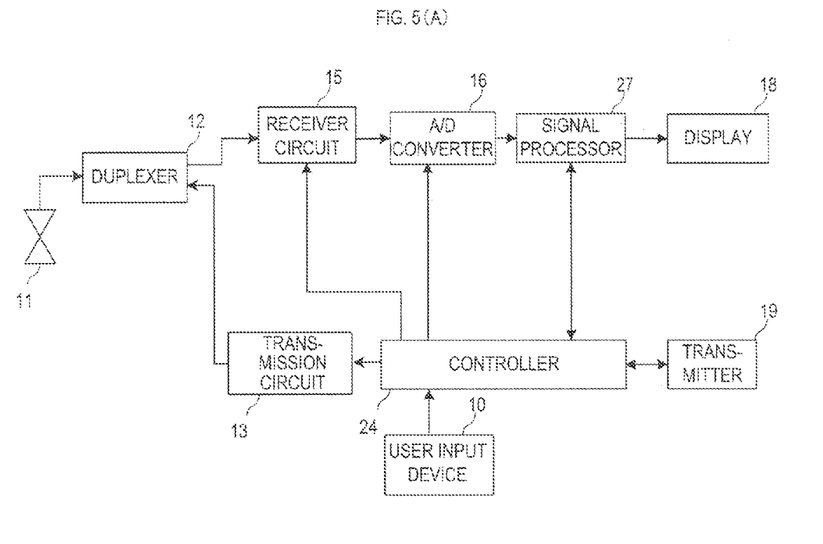

FIG. 5 (A) is a block diagram showing the components of the fish detector 2. Regarding the fish detector 2, the similar reference numbers are given to similar components of the fish detector 1 shown in FIG. 1 (B) and a detailed explanation of such similar components is omitted for the sake of brevity. Although the signal processor 27 of the fish detector 2 has the same function as the signal processor 17 of the fish detector 1, it does not have various discrimination functions including the fish species discrimination.

The controller 24 receives the fish species information from the fish detector 1. Moreover, the controller 24 receives the position information from the sensor 4 for every ping and stores it in memory (not shown). The acquisition module of the present invention is embodied by the transmitter 19 and the controller 24. The controller 24 outputs the fish species information received from the fish detector 1 to the signal processor 27.

The signal processor 27 executes the school of fish detection from the detection results of the device itself. For example, the signal processor 27 determines the school of fish exists when the echo more than a predetermined level exists between the sea surface and the sea bottom. When the school of fish is detected, the signal processor 27 inputs the position information for every ping from the controller 24 and compares the position of the detected school of fish with the fish species information received from the controller 24. That is, when the position (the longitude, the latitude, and the depth) of the detected school of fish and the position information included in the fish species information inputted from the controller 24 are the same or close, the fish species information inputted from the controller 24 is considered to be corresponding to the school of fish detected by the device and the display data in which the fish species information inputted from the controller 24 is superimposed and displayed on the echo data showing the detection result is generated. Moreover, when there is a plurality of detected schools of fish, the school of fish with the nearest position is determined to be corresponding. In addition, regarding the longitude, the latitude, and the depth, when at least one of them is matched the school of fish might be determined to be corresponding, or alternatively, only when all of them are matched the school of fish might be determined to be corresponding. In this manner, the controller 24 embodies the determiner of the present invention.

Figure 3B:
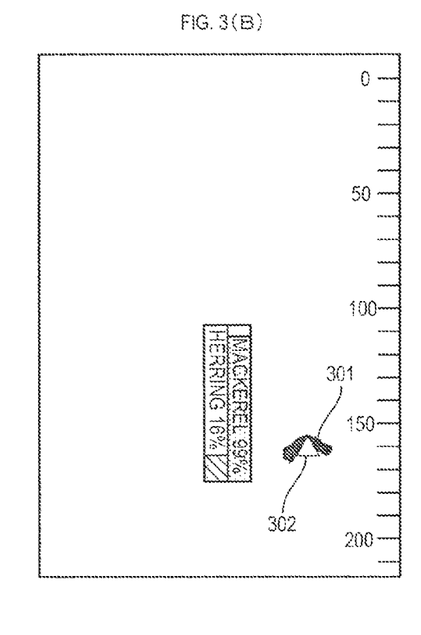

FIG. 3 (B) is an illustration showing display examples of the display 18 in fish detector 2. As shown in FIG. 3 (B), the echo data which assigned the depth at the longitudinal axis and the ping at the horizontal axis are displayed in the display 18, and the echo data 301 of the school of fish is displayed on the right hand side of the middle of the screen as the detection result of the fish detector 2. Then the fish species information (Mackerel 99% and Herring 16% shown in the figure) inputted from controller 24 is displayed in vicinity of the echo data 301.

In addition, when the fish species information inputted from the controller 24 is determined to be corresponding to the school of fish detected by the device itself, only a mark 302 as shown in FIG. 3 (B) might be displayed at the position of the school of fish. In this case, when the user operates the user input device 10 and selects the mark 302, the fish species information will be displayed.

Moreover, fish species information including not only the similarity but also histogram data can be transmitted and received so that the histogram can be also displayed in the fish detector 2.

Figure 5B:
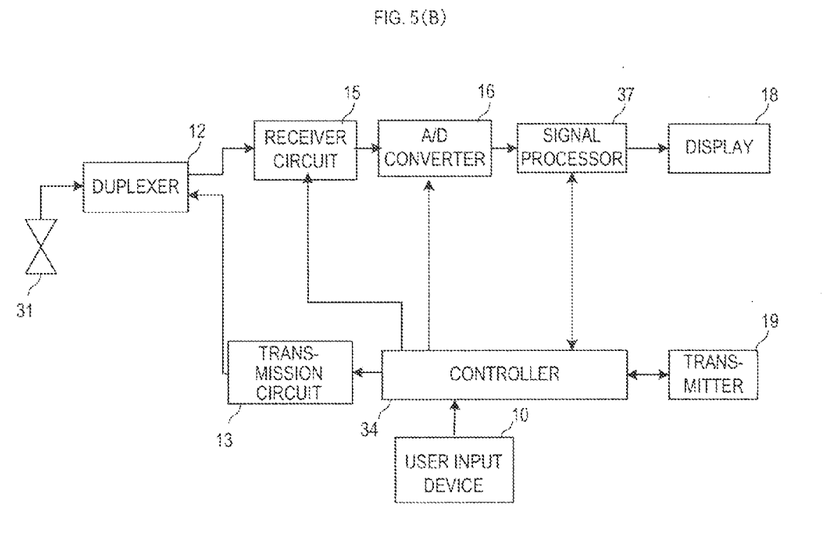

FIG. 5 (B) is a block diagram showing the components of the sonar 3. Although the sonar 3 has the same fundamental components as the fish detector 2 and has the same functions, an ultrasonic wave is transmitted and received except for in a direction directly below the sonar. In this example, the sonar 3 comprises an echo sounder transducer 31 which consists of a plurality of vibrators attached to the ship bottom. The echo sounder transducer 31 outputs the ultrasonic wave around the ship itself and receives the echo signal reflected in targets, such as a single fish, a school of fish, and the sea bottom.

The controller 34 receives the fish species information from the fish detector 1. Moreover, it receives the position information from the sensor 4 and stores it in the memory (not shown). The controller 34 outputs the fish species information received from the fish detector 1 to the signal processor 37.

The signal processor 37 executes the school of fish detection from the detection result of the device itself. For example, the signal processor 37 determines the school of fish exists when an echo of more than a predetermined level exists between the sea surface and the sea bottom. When the school of fish is detected, the signal processor 37 inputs the position information and calculates the position (latitude and longitude) of the school of fish from the received signal, the output angle of the ultrasonic wave, and the position information of the ship itself received from sensor 4, etc. The signal processor 37 compares the calculated position of the school of fish with the fish species information received from the controller 34. That is, when the calculated position of the school of fish and the position information included in the fish species information inputted from the controller 34 are the same or close, the fish species information inputted from the controller 34 is considered to be corresponding to the school of fish detected by the device itself and the display data in which the fish species information inputted from the controller 34 is superimposed and displayed on the echo data showing the detection result is generated. In the same manner as discussed above, when there are a plurality of detected schools of fish, the school of fish having the nearest position is determined to be corresponding.

Figure 3C:
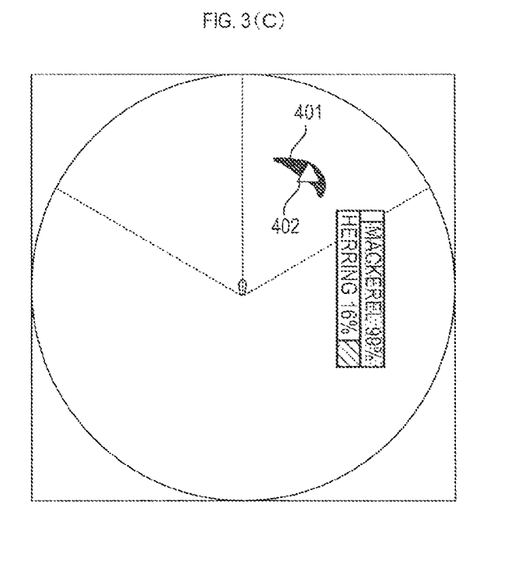

FIG. 3 (C) is an illustration showing a display example of the display 18 in the sonar 3. As shown in FIG. 3 (C), the ship itself is displayed on the middle of the screen and the echo data is displayed by the rectangular coordinate system corresponding to the direction and the distance. In this example, the echo data 401 from the school of fish is displayed on the upper right of the display as the result of the sonar 3. Then, the fish species information (Mackerel 99% and Herring 16% shown in the figure) inputted from controller 34 is displayed in vicinity of the echo data 401.

Additionally in this example, when the fish species information inputted from the controller 34 is determined to be corresponding to the school of fish detected by the device itself, at the position of the school of fish as shown in FIG. 3 (C) only a mark 402 may be displayed. In this case, when the user operates the user input device 10 and selects the mark 402, the fish species information will be displayed.

Moreover, fish species information including not only similarity but also histogram data can be transmitted and received so that a histogram can be also displayed via the sonar 3.

Figure 8A:
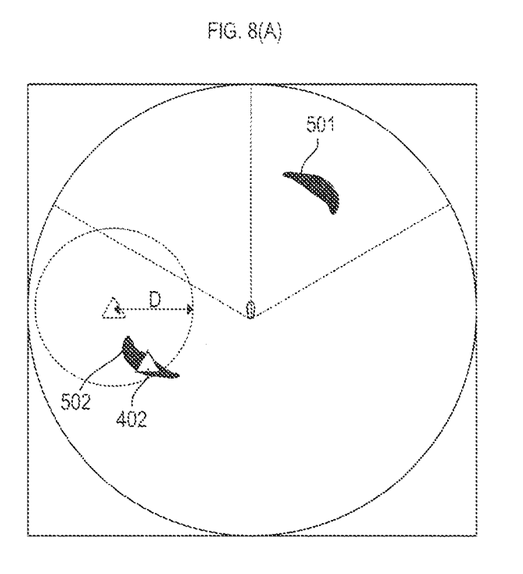
FIGS. 8(A) and 8(B) are diagrams showing other examples of a determination method of a corresponding school of fish.
Figure 8B:
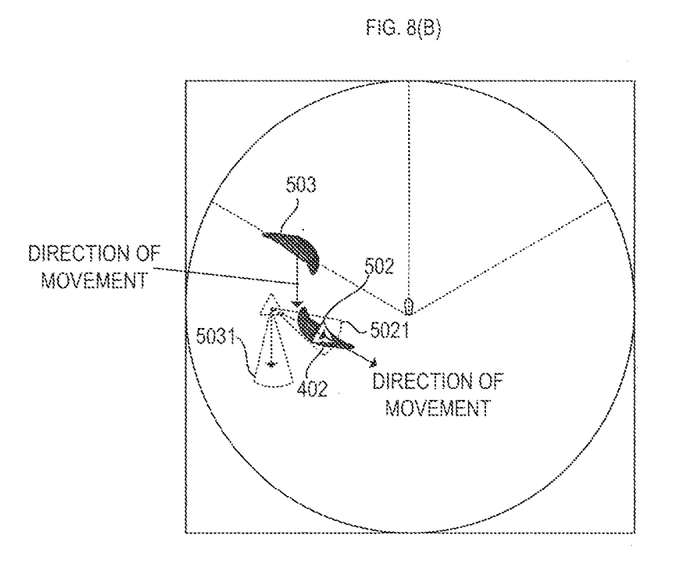

Additionally, since the time t1 when the fish species is determined by the fish detector 1 and the time t2 when the determination is processed on the sonar 3 (or the fish detector 2) are not necessarily the same time, a determination with consideration of the position change of a school of fish that move during a time difference ($\Delta t=t2-t1$) is desirable. For example, as shown in FIGS. 8(A) and 8(B), when the school of fish exists within the range of a distance d ($\Delta t \times$swimming velocity) calculated from the swimming velocity of the school of fish, the school of fish is determined to be corresponding. In the example of FIG. 8 (A), although the school of fish 501 and the school of fish 502 exist, only the school of fish 502 that exists within the range of the distance d from the received position information is determined to be the corresponding school of fish, and the mark 402 is superimposed on the school of fish 502. In addition, although the swimming velocity may be a fixed value corresponding to the average swimming velocity of the school of fish, the swimming velocity can be calculated from an elapsed time between scanning and by detecting the position changes of the school of fish between scanning by the sonar 3. Moreover, from the position changes of the school of fish between scanning, the movement direction of the school of fish can be taken into consideration. For example, as shown in FIG. 8 (B), when a school of fish 502 and a school of fish 503 exist at approximately the same distance as determined from the received position information, sonar 3 may judge from the received position information whether a school of fish exists or not in an area 5021 and an area 5031 that correspond to the direction of movement of each school of fish. The school of fish (school of fish 502 in the example of FIG. 8 (B)) that is determined to exist within the area after taking into account the movement direction of the school of fish, is determined to be corresponding.

In addition, after determining the corresponding school of fish, the superimposed mark or the fish species information can be moved along with the movement of the school of fish so that an appropriate display can be kept on the screen of the sonar 3 even if the school of fish moves.

Moreover, although the present embodiment shows an example of transmitting and receiving the result of the fish species discrimination, it is also possible to transmit and receive other information such as a measurement result of the fish body length, etc. Furthermore, it is also possible to display the echo image itself on other devices by transmitting and receiving the echo image itself. For example, in case of detecting the school of fish by the fish detector 1, even if the position of the school of fish exists outside of the detection area of the sonar 3, by transmitting and receiving the echo image and the position information of the school of fish, the echo image can be superimposed and displayed at the appropriate position on the display screen of the sonar 3.

Moreover, the received discrimination result can be displayed not only on an underwater detection device such as a fish detector or sonar, etc., but also on the display of other devices such as a radar or a plotter, etc.

Figure 6A:
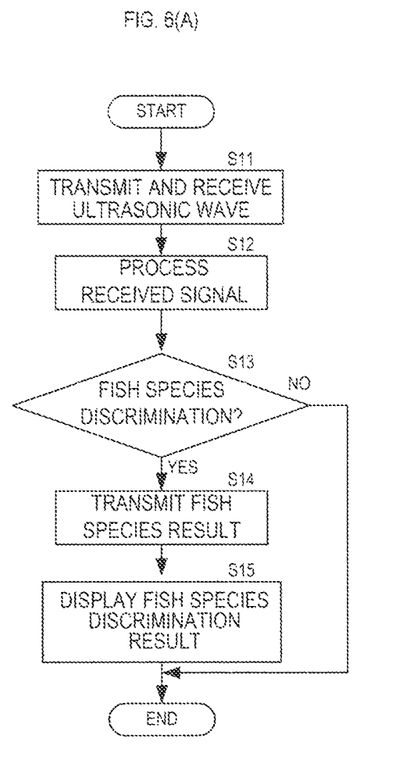
Figure 6B:
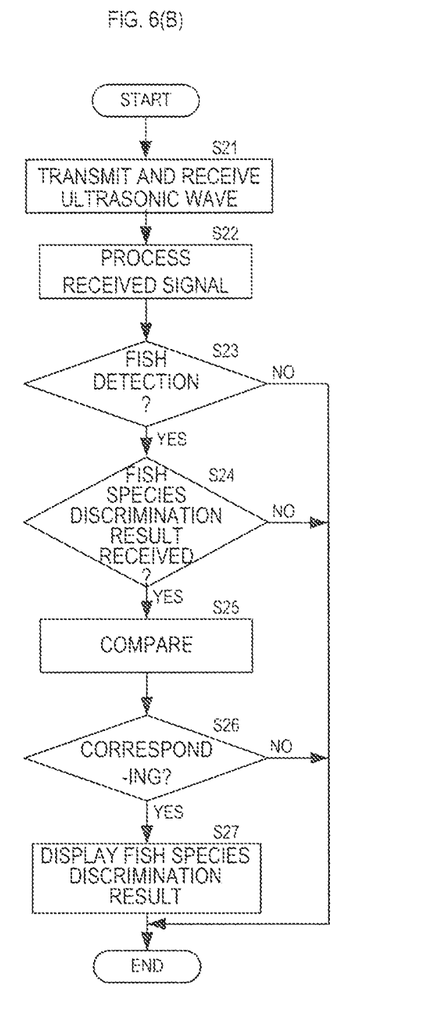

Next, FIG. 6 (A) is a flow chart showing an operation of the fish detector 1. FIG. 6 (B) is a flow chart showing an operation of the fish detector 2 (or the sonar 3).

First of all, the fish detector 1 transmits and receives an ultrasonic wave (s11). Second, the fish detector 1 processes the received signal (s12). That is, the signal processor 17 generates an echo data corresponding to the depth according to the elapsed time after outputting the ultrasonic wave and executes various discrimination processes such as fish species discrimination, etc.

After that, the controller 14 of the fish detector 1 determines whether the fish species was able to be discriminated or not from the received signal at the signal processor 17 (s13). When the fish species was not discriminated, the operation will be terminated. When the fish species was discriminated, the controller 14 transmits the result of the fish species discrimination to the other devices (s14). Then, the signal processor 17 displays the result of the fish species discrimination on the display 18 (s15).

Meanwhile, the fish detector 2, which is on the receiving side, transmits and receives the ultrasonic wave first (s21). Then, the fish detector 2 processes the received signal (s22). That is, the signal processor 27 generates echo data corresponding to the depth according to the elapsed time after outputting the ultrasonic wave. Furthermore, the signal processor 27 detects the school of fish at this time.

The controller 24 judges whether the school of fish was detected or not at the signal processor 27 (s23) and judges whether the result of the school of fish discrimination was received from the fish detector 1 (s24). When the school of fish was not detected or the result of the school of fish discrimination was not received, the operation will be terminated.

When the school of fish was detected and the result of the fish species discrimination was received, the signal processor 27 inputs the position information for each ping and compares the position of the detected school of fish with the received result of the fish species discrimination (s25).

When the position of the detected school of fish and the position information included in the inputted result of the fish species discrimination are the same or close, the signal processor 27 determines that the inputted result of fish species discrimination and the detected fish species by the device itself are corresponding (s26). When it determines that they are not corresponding, the operation will be terminated.

When the signal processor 27 determines that the inputted result of fish species discrimination and the detected fish species by the device itself are corresponding, the inputted result of fish species discrimination is displayed on the display 18 (s27).

In this manner, at the fish detector 2 (or the sonar 3), the result of fish species discrimination of the fish detector 1 is superimposed and displayed on the detection result of the device itself.

Moreover, although the flow chart shown in FIG. 6 (B) shows an example that detects a target such as the school of fish in the detection result of the device itself and displays the discrimination result after corresponding the detection target to the received discrimination result, even though the device itself does not detect a target, the received discrimination result may be displayed. For example, as discussed above, when the echo image itself is transmitted and received, regardless of the result of the target detection of the device itself, it is desirable to superimpose and display the received echo image on the detection result of the device.

In this manner, the various discrimination results, such as the fish species discrimination, etc., are transmitted to the fish detector 2 or the sonar 3 through onboard LAN 5 from the fish detector 1 with the fish species discrimination function, and the various discrimination results received are superimposed and displayed on the display, so that a variety of information can be collected or gathered at one device even when a plurality of underwater detection devices exists. Although the user, especially in the case of fishing, determines the school of fish to catch by comparing the echo images of a plurality of fish detectors with the echo image of the sonar in many cases, the underwater detection system according to the first embodiment enables the user to determine the school of fish to catch by collecting or gathering the discrimination results for each school of fish at one fish detector or sonar.

Figure 7A:
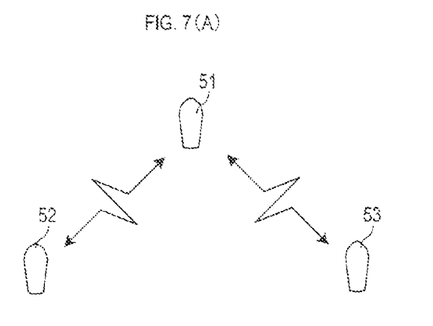
FIGS. 7(A) and 7(B) are schematic diagrams showing a component of an underwater detection system according to a second embodiment.
Figure 7B:
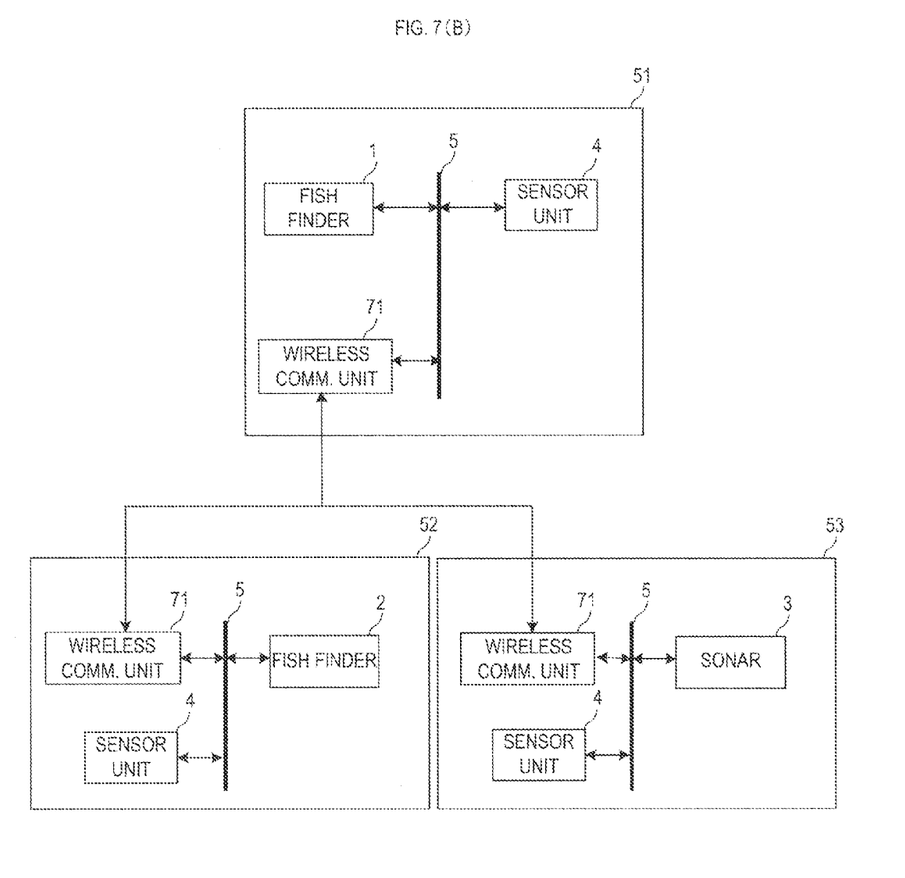

A second embodiment. FIG. 7 (A) is a schematic diagram showing components of an underwater detection system according to a second embodiment. The underwater detection system according to the second embodiment comprises a plurality of marine vessels (a marine vessel 51, a marine vessel 52, and a marine vessel 53). FIG. 7 (B) is a block diagram showing the components of each device on board of the marine vessel 51, a marine vessel 52, and a marine vessel 53. In addition, similar reference characters are used to indicate components similar to those in the first embodiment, and the explanation thereof is omitted for the sake of brevity.

The marine vessel 51 comprises a fish detector 1 that is connected through onboard LAN 5, a sensor 4, and a radio communicator 71. The composition and function of the fish detector 1, the sensor 4, and the onboard LAN 5 are in common with the first embodiment.

The marine vessel 52 comprises a fish detector 2 that is connected through onboard LAN 5, a sensor 4, and a radio communicator 71. The composition and function of the fish detector 2, the sensor 4, and the onboard LAN 5 are in common with the first embodiment.

The marine vessel 53 comprises a sonar 3 that is connected through onboard LAN 5, a sensor 4, and a radio communicator 71. The composition and function of the fish detector 1, the sensor 4, and the onboard LAN 5 are in common with the first embodiment.

Although an example that transmits the discrimination result of the fish detector 1 to other devices within the ship connected through onboard LAN 5 was shown in the first embodiment, the discrimination result of the fish detector 1 is transmitted to other devices in other ships.

In the second embodiment, when performing fleet operation, it is possible for the other ships to refer to the information of the school of fish that is discovered by a marine vessel, so that the smooth operation can be achieved.

Moreover, since the received discrimination result can be displayed not only on an underwater detection device such as the fish detector or the sonar, etc., but also on the display of other devices such as a radar or a plotter, etc., it becomes possible to refer to the information on the school of fish in the marine vessel without the fish detector and the sonar.

We claim:

1. An underwater detection device that detects a plurality of schools of fish, including a first and second school of fish, based on an echo received from an underwater detector by transmitting and receiving an ultrasonic wave, and displays an echo image of the plurality of schools of fish, including the first and second school of fish, on a screen, comprising:
    an acquisition module, comprising a transmitter and controller, configured to acquire, from one or a plurality of external fish identifying devices, position information indicating positions and associated fish species information for each of the plurality of schools of fish;
    a determiner, comprising the controller, for determining based on the position information whether the first school of fish displayed as the echo image on the screen matches one of the positions and associated fish species information for each of the plurality of schools of fish indicated by the position information; and
    a display combiner, comprising a signal processor operatively coupled to the controller and the screen, for displaying one of the acquired fish species information superimposed on the echo image of the first school of fish on the screen when the determiner determines that one of the positions and associated fish species information matches the first school of fish on the screen, wherein
    among the plurality of schools of fish displayed on the screen, the determiner determines that one of the positions and associated fish species information matches the first school of fish based on a swimming velocity of the first school of fish, or
    the determiner determines that one of the positions and associated fish species information matches the second school of fish based on a swimming velocity and a movement direction of the second school of fish.

2. The underwater detection device according to claim 1, wherein the external device is a fish detector.

3. The underwater detection device according to claim 2, wherein the position information includes longitude and latitude.

4. The underwater detection device according to claim 3, wherein the position information includes depth information of the school of fish.

5. The underwater detection device according to claim 1, wherein the display combiner moves the superimposed fish species information along with the movement of the school of fish determined by the determiner.

6. The underwater detection device according to claim 5, wherein the fish species information includes information of a fish body length.

7. An underwater information display system, comprising:
    a fish detector for transmitting and receiving an ultrasonic wave directly below the device itself, detecting positions and associated fish species information of a plurality of schools of fish, including a first and second school of fish, from an acquired echo signal, and transmitting position information indicating the detected positions and associated fish species information of the plurality of schools of fish, including the first and second school of fish; and
    an underwater detection device having an acquisition module, comprising a transmitter and controller, that acquires the position information, the underwater detection device detecting the plurality of schools of fish, including the first and second school of fish, based on an echo acquired by underwater detection by transmitting and receiving the ultrasonic wave, and displaying an echo image of the plurality of schools of fish, including the first and second school of fish, on a display,
    a determiner, comprising the controller, that determines based on the position information whether the first school of fish displayed as the echo image on the display matches one of the positions and associated fish species information for each of the plurality of schools of fish indicated by the position information, and
    a display combiner, comprising a signal processor operatively coupled to the controller and the display, that displays one of the acquired fish species information by superimposing on the echo image of the first school of fish on the display when the determiner determines that one of the positions and associated fish species information matches the first school of fish on the display, wherein among the plurality of schools of fish displayed on the display, the determiner determines that one of the positions and associated fish species information matches the first school of fish based on a swimming velocity of the first school of fish, or the determiner determines that one of the positions and associated fish species information matches the second school of fish based on a swimming velocity and a movement direction of the second school of fish.

8. The underwater information display system according to claim 7, wherein the position information includes longitude and latitude.

9. The underwater information display system according to claim 8, wherein the position information includes depth information of the school of fish.

10. The underwater information display system according to claim 7, wherein the display combiner moves the superimposed fish species information along with the movement of the school of fish determined by the determiner.

11. The underwater information display system according to claim 10, wherein the fish species information includes information of a fish body length.

12. An underwater information display method according to which an underwater detection device detects a plurality of schools of fish, including a first and second school of fish, based on an echo acquired by underwater detection by transmitting and receiving an ultrasonic wave and displays an echo image of the plurality of schools of fish on a screen, comprising the steps of:

at a fish detector:
  transmitting and receiving an ultrasonic wave directly below the device itself, detecting positions and associated fish species information of the plurality of schools of fish from an acquired echo signal, and transmitting position information indicating the detected positions and associated fish species information of the plurality of schools of fish, and at the underwater detection device:
  acquiring the position information;
  detecting the plurality of schools of fish, including the first and second school of fish, based on an echo acquired by underwater detection by transmitting and receiving the ultrasonic wave, and displaying the echo image of the plurality of schools of fish on the screen;
  with a determiner, determining based on the position information whether the first school of fish displayed as the echo image on the screen matches one of the positions and associated fish species information for each of the plurality of schools of fish indicated by the position information, and displaying one of the acquired fish species information by superimposing on the echo image of the first school of fish on the screen when the determiner determines that one of the positions and associated fish species information matches the first school of fish on the screen, wherein among the plurality of schools of fish displayed on the screen, the determiner determines that one of the positions and associated fish species information matches the first school of fish based on a swimming velocity of the first school of fish, or the determiner determines that one of the positions and associated fish species information matches the second school of fish based on a swimming velocity and a movement direction of the second school of fish.

* * * * *